United States Patent
Duggana et al.

(10) Patent No.: US 9,672,123 B2
(45) Date of Patent: Jun. 6, 2017

(54) DEPLOYING SERVICES ON APPLICATION SERVER CLOUD WITH HIGH AVAILABILITY

(71) Applicant: Oracle International Corporation, Redwood Shores, CA (US)

(72) Inventors: Satish Duggana, Bangalore (IN); Amit Jhunjhunwala, Bangalore (IN); Srimant Misra, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 196 days.

(21) Appl. No.: 14/588,148

(22) Filed: Dec. 31, 2014

(65) Prior Publication Data
US 2016/0188425 A1    Jun. 30, 2016

(51) Int. Cl.
*G06F 11/07*    (2006.01)
*G06F 11/20*    (2006.01)
*H04L 12/24*    (2006.01)

(52) U.S. Cl.
CPC ........ *G06F 11/203* (2013.01); *G06F 11/2025* (2013.01); *H04L 41/0668* (2013.01); *G06F 2201/805* (2013.01)

(58) Field of Classification Search
CPC . G06F 11/202; G06F 11/2041; G06F 11/2097
USPC .................................. 714/4.11, 6.3
See application file for complete search history.

(56) References Cited

U.S. PATENT DOCUMENTS

| | | |
|---|---|---|
| 6,944,788 B2 | 9/2005 | Dinker et al. |
| 7,600,148 B1 | 10/2009 | Shaw et al. |
| 7,937,616 B2 | 5/2011 | Armstrong et al. |
| 8,498,961 B2 | 7/2013 | Edlund et al. |
| 2002/0194015 A1* | 12/2002 | Gordon ................. G06Q 10/10 705/1.1 |
| 2007/0174660 A1 | 7/2007 | Peddada |
| 2009/0106255 A1* | 4/2009 | Lacapra .............. G06F 11/1076 |

(Continued)

OTHER PUBLICATIONS

Bouabache, F. et al. (2008). "Hierarchical Replication Techniques to Ensure Checkpoint Storage Reliability in Grid Environment," *Cluster Computing and the Grid, 2008, CCGRID '08*, 8th IEEE International Symposium on May 19-22, 2008, Abstract Only, located at <http://ieeexplore.ieee.org/xpl/login.jsp?tp=&arnumber=4534252&url=http%3A%2F%2Fieeexplore.ieee.org%2Fxpls%2Fabs_all.jsp%3Farnumber%3D4534252>, retrieved on Mar. 2, 2015, 2 pages.

(Continued)

*Primary Examiner* — Chae Ko
(74) *Attorney, Agent, or Firm* — Kilpatrick Townsend & Stockton LLP

(57) ABSTRACT

Techniques are disclosed for deploying services in a server cluster environment. Certain techniques are disclosed for deploying services to a cluster based on a replication policy that includes a plurality of configurable parameters. In some embodiments, the configurable parameters (also referred to herein as replication factors) can define a number of nodes to which a service is to be deployed, a number of nodes to which a service is to be prepared, and/or a number of nodes to which a service is replicated. Based on the configurable parameters, the replication policy enables users and/or cluster providers to guarantee different levels of performance and/or reliability.

18 Claims, 9 Drawing Sheets

(56) References Cited

U.S. PATENT DOCUMENTS

| | | | | |
|---|---|---|---|---|
| 2011/0197198 | A1* | 8/2011 | Kanso | G06F 9/5083 |
| | | | | 718/105 |
| 2012/0240129 | A1* | 9/2012 | Kanso | G06F 9/505 |
| | | | | 718/105 |
| 2012/0284571 | A1* | 11/2012 | Stanko | G06F 11/3006 |
| | | | | 714/49 |
| 2013/0031403 | A1 | 1/2013 | Mordani et al. | |
| 2013/0263122 | A1 | 10/2013 | Levijarvi et al. | |
| 2014/0188825 | A1* | 7/2014 | Muthukkaruppan | |
| | | | | G06F 17/30339 |
| | | | | 707/694 |
| 2014/0201218 | A1* | 7/2014 | Catalano | G06F 8/60 |
| | | | | 707/748 |
| 2016/0004611 | A1* | 1/2016 | Lakshman | G06F 11/2058 |
| | | | | 714/6.23 |
| 2016/0085462 | A1* | 3/2016 | Buzzard | G06F 3/0619 |
| | | | | 711/162 |

OTHER PUBLICATIONS

Hunter, J. (Revised Feb. 2015). "VMware vSphere® Replication™ 6.0," Technical White Paper, VMware Inc., 12 pages.

Abad, C.L. et al. (2011). "DARE: Adaptive Data Replication for Efficient Cluster Scheduling," *Cluster Computing (CLUSTER)*, 2011 IEEE International Conference on Sep. 26-30, 2011, 12 pages.

"Consistent hashing," *Wikipedia*, located at <http://en.wikipedia.org/wiki/Consistent_hashing>, retrieved on Mar. 3, 2015.

Kleinpeter, T. (Mar. 17, 2008). "Programmer's Toolbox Part 3: Consistent Hashing," *Toolbox*, located at <http://www.spiteful.com/2008/03/17/programmers-toolbox-part-3-consistent-hashing/>, retrieved on Mar. 3, 2015.

"Paxos (computer science)," *Wikipedia*, located at <http://en.wikipedia.org/wiki/Paxos_(computer_science)>, retrieved on Mar. 3, 2015.

Lamport, L. (Nov. 1, 2001). "Paxos Made Simple," *Microsoft Research*, located at <http://research.microsoft.com/en-us/um/people/lamport/pubs/paxos-simple.pdf>.

* cited by examiner

DEPLOYING SERVICES ON APPLICATION SERVER CLOUD WITH HIGH AVAILABILITY

BACKGROUND

The present disclosure relates generally to the deployment of services in a server cluster environment, and in particular to deploying high availability services such that node startup time is reduced during failover.

Web-based applications and services are often deployed to server clusters. Server clusters can include a number of nodes (e.g., application servers, web servers, or other computing device) and can be managed to provide improved performance and reliability using low cost off-the-shelf components. Performance improvements can be achieved through load-balancing, which distributes requests to be serviced across the nodes in the cluster (e.g., based on current workload or other performance metric). Additionally, having multiple nodes available in a cluster enables one node to take over processing for another node in the event of failure (e.g., failover), improving reliability. For example, when one node fails, an application or service hosted by the failed node can be migrated to a failover node, prepared, and then started.

Increasingly, customers demand performance and/or reliability guarantees (e.g., "high availability" clusters may guarantee a minimum down-time). Traditional cluster management schemes may not be able to meet ever increasing guarantees for higher performance and/or reliability.

BRIEF SUMMARY

The present disclosure relates generally to the deployment of services in a server cluster environment, and in particular to deploying high availability services such that node startup time is reduced during failover.

Traditionally, server clusters have implemented failover policies which provide for migrating and restarting services upon failure of a node in the cluster. Such failover policies may define a particular back-up node within the cluster to be used upon failover. However, the failover process can be time consuming, particularly in large clusters, which can impact the down-time experienced by users. This can pose a particular problem for high availability (HA) services which may be considered to be available when the service is running on a particular number of nodes (e.g., M nodes). As such, if a node fails such that the service is running on fewer than the particular number of nodes (e.g., fewer than M nodes), then the service is considered unavailable. Such down-time can violate service guarantees made by the HA service provider.

In some embodiments, services can be deployed to a cluster based on a replication policy that includes a plurality of configurable parameters. These configurable parameters (also referred to herein as replication factors) can define a number of nodes to which a service is to be deployed, a number of nodes to which a service is to be prepared, and/or a number of nodes to which a service is replicated. Based on the configurable parameters, the replication policy enables users and/or cluster providers to guarantee different levels of performance and/or reliability.

The foregoing, together with other features and embodiments will become more apparent upon referring to the following specification, claims, and accompanying drawings.

DETAILED DESCRIPTION

Figure 1:
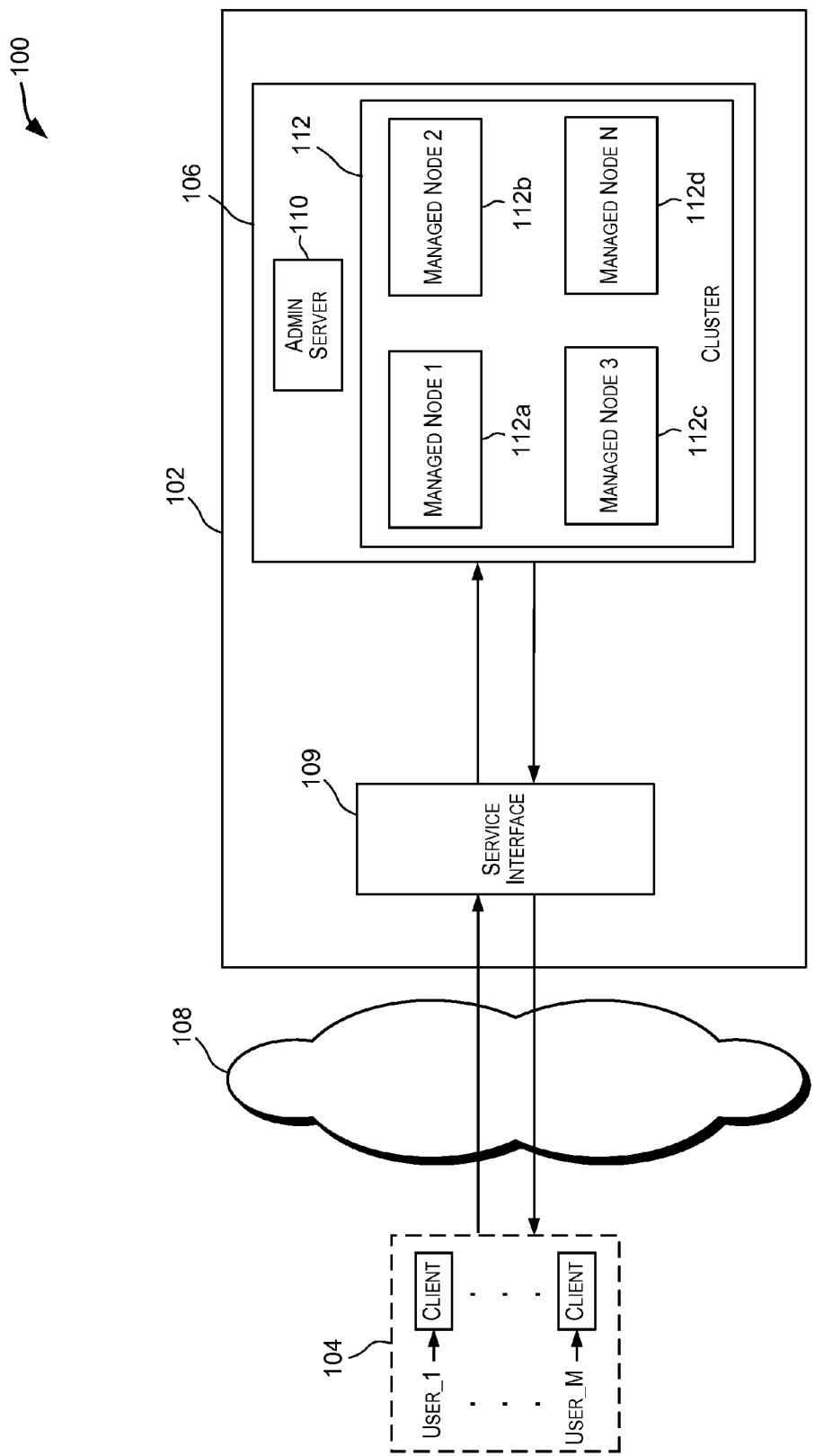
FIG. 1 depicts a simplified high level diagram of a network environment that may incorporate an embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

As described above, traditional failover policies provide limited options which may fail to provide a required level of service. In certain embodiments, to address the shortcomings of traditional failover processes, services can be deployed to a cluster based on a replication policy that can include one or more configurable parameters (also referred to herein as replication factors). The replication factors can be used to determine how a service is to be deployed in a cluster. For example, the replication factors can define the number of nodes to which a service is to be deployed, the number of nodes to which a service is prepared, and the number of nodes to which a service is replicated. As used herein, a node can refer to a virtual machine and/or physical machine. In some embodiments, a plurality of virtual machine nodes can execute on the same physical machine. In some embodiments, a replication policy can be defined for a particular service. In some embodiments, multiple services can be deployed based on the same replication policy.

As described above, a replication policy can be associated with a plurality of replication factors. The replication factors can include a deployment replication factor (D) that defines a number of nodes to which the service is deployed running In the case of HA services, D may represent a minimum number of nodes for the service to be considered available. In addition to the deployment replication factor, embodiments of the present invention add additional replication factors, including a prepared replication factor (P) and a service replication factor (S). The prepared replication factor can be used to determine a number of nodes to which the service is replicated and configured, but not running, and the service replication factor can be used to determine a number of nodes to which the service is replicated but not configured.

In some embodiments, the values of D, P, and S can be related such that D≤P≤S, such that each replication factor is inclusive of the previous replication factor. For example, S represents the number of nodes to which a service has been replicated, including the nodes to which it has been configured (P) and the nodes to which is has been configured and is running (D). By configuring the values of D, P, and S, a user or administrator can change the provided level of service to suit the user's needs. In some embodiments, the user or administrator can configure parameters that represent the difference between D, P, and S (referred to herein as $D_X$, $P_X$, and $S_X$). In this example, $D_X$ can represent a number of nodes in which the service is deployed and running (e.g., $D_X$=D); $P_X$ can represent a number of nodes in which the service is prepared, other than the D nodes (e.g., P=$P_X$+D); and $S_X$ can represent a number of nodes in which the service is replicated other than the P nodes (e.g., S=$S_X$+P).

When a node fails, a cluster manager can detect the node failure and start the service on the next P node, reducing down time of the service. The cluster manager can then identify the next node in the cluster to be configured based on the prepared replication value, and the next node in the cluster to which to replicate the service based on the service replication factor. In some embodiments, nodes can be identified using a consistent hashing algorithm. Under the consistent hashing algorithm, a cluster can belong to a ring that includes a plurality of hash values. Each node in the cluster can be assigned a hash value from the ring. When a new node is added to the cluster, the next hash value from the ring can be assigned to the new node. As such, when a given node fails, the cluster manager can use the hash values in the ring to identify the next node in the cluster. While certain embodiments have been disclosed describing how replication policies can be implemented with respect to clusters that use consistent hashing, this is not intended to be restrictive. The teachings disclosed herein can also be applied to other cluster topologies.

While certain embodiments have been disclosed describing how services can be deployed and replicated in an application server cluster in a cloud infrastructure environment, this is not intended to be restrictive. The teachings disclosed herein can also be applied to other implementation environments (e.g., private clouds, public clouds, etc.) and/or other types of clusters (e.g., web servers, application servers, etc.). The teachings are applicable to any computing environment in which services and/or applications are replicated.

FIG. 1 depicts a simplified high level diagram of a network environment 100 that may incorporate an embodiment of the present invention. As shown, network environment 100 comprises multiple client devices 104 communicatively coupled to a cloud infrastructure system 102 via a communication network 108. The embodiment depicted in FIG. 1 is merely an example and is not intended to unduly limit the claimed embodiments of the present invention. One of ordinary skill in the art would recognize many variations, alternatives, and modifications. For example, there may be more or fewer client devices than those shown in FIG. 1.

The client devices may be of various different types, including, but not limited to personal computers, desktops, mobile or handheld devices such as a laptop, a mobile phone, a tablet, etc., and other types of devices. Communication network 108 facilitates communications between client devices 104 and cloud infrastructure system 102.

Communication network 108 can be of various types and can include one or more communication networks. Examples of communication network 108 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, communication network 108 may include any communication network or infrastructure that facilitates communications between clients and adaptive webpages system 102.

In some embodiments, cloud infrastructure system can include a cluster 106 to which one or more services can be deployed. In some embodiments, cloud infrastructure system 102 can include a service interface 109 that is configured to receive and manage requests from client devices 104 and responses from cluster 106. Service interface 109 can be a web interface, load balancer, or any other interface, that mediates requests and responses between client devices 104 and cluster 106. In some embodiments, cluster 106 can include an administration server 110 and a plurality of managed nodes 112 (e.g., managed nodes 1-N 112a-112d). Each node in cluster 106 can be a virtual node, physical node, or a combination thereof. For example, administration server 110 and managed nodes 112 can each be virtual nodes executing on a single physical node (e.g., software nodes implemented on one or more virtual machines executing on a single hardware computing device). Alternatively, each of administration node 110 and managed nodes 112 can be implemented as separate physical nodes. Cluster 106 is described below in further detail with respect to FIG. 2.

Figure 2:
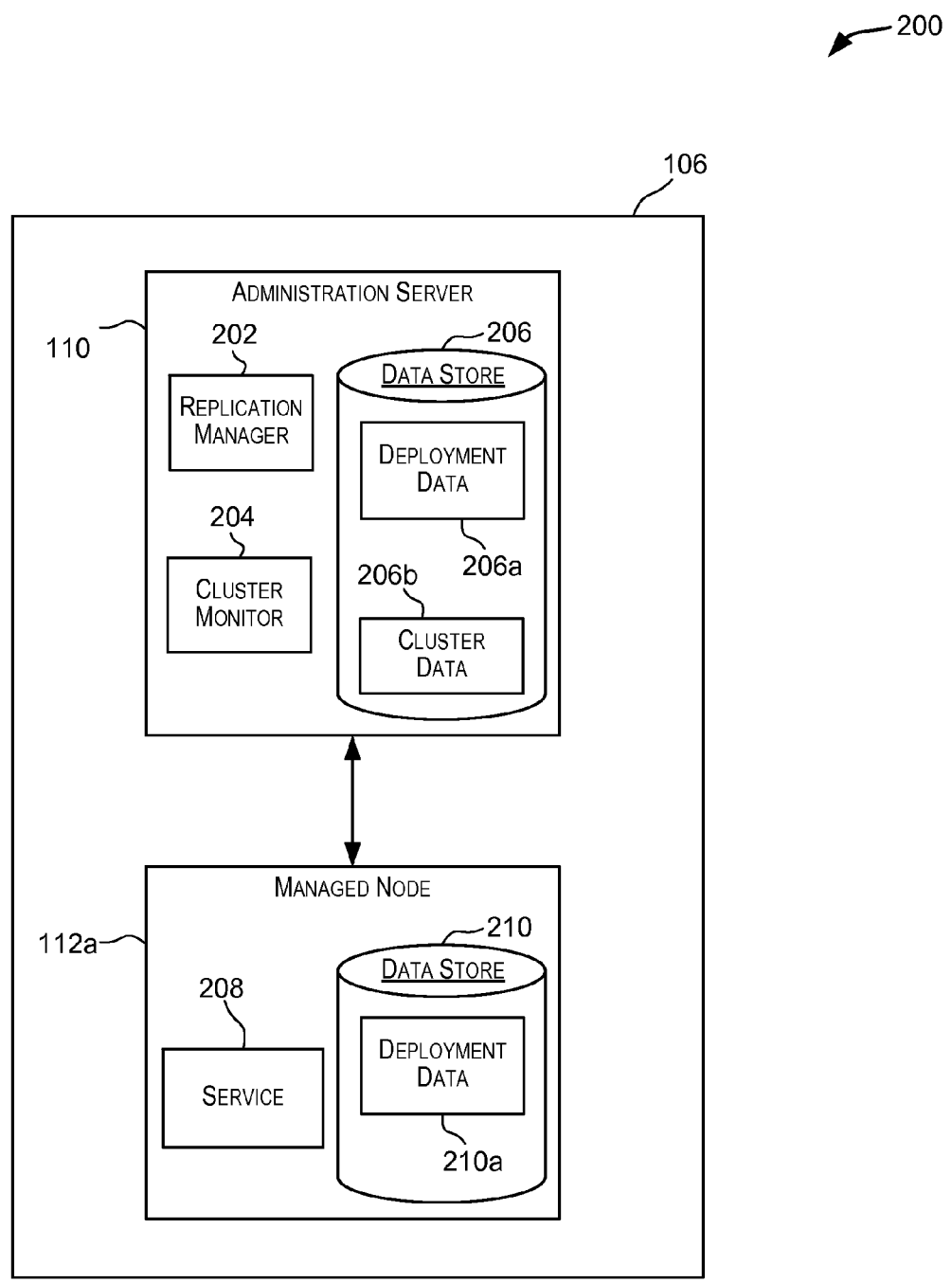
FIG. 2 depicts a more detailed high level diagram of a server system including an administration server and a managed node according to an embodiment of the present invention.

FIG. 2 depicts a more detailed high level diagram of a server system 200 including an administration server and a managed node according to an embodiment of the present invention. As described above with respect to FIG. 1, a cluster 106 can include an administration server 110 and one or more managed nodes 112. The example shown in FIG. 2 includes a more detailed view of administration server 110 and a managed node 112a. Administration server 110 can include a replication manager 202 and a cluster monitor 204. In some embodiments, administration server can include, or may be communicatively coupled to, a data store 206 which maintains deployment data 206a and cluster data 206b. In some embodiments, replication manager 202 can maintain the values of replication factors D, P, and S. Users and or administrators can access replication manager 202 to configure values of D, P, and S and/or $D_X$, $P_X$, and $S_X$. In some embodiments, replication manager 202 can be accessed by a user through a web interface (e.g., service interface 109) and/or through an administration console. Cluster monitor 204 can monitor activity associated with each managed node 112. In some embodiments, each managed node can send messages at regular intervals (e.g., heartbeat messages) to cluster monitor 204 to indicate that the managed node is still active. If the cluster monitor 204 determines that a managed node 112a has failed to send one or more heartbeats over a particular interval, the cluster monitor can identify that managed node 112a as unavailable and can initiate failover processing.

Replication manager 202 and cluster monitor 204 may be implemented in software (e.g., program code, instructions executable by a processor), in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

In some embodiments, cluster monitor 204 can use deployment data 206a and cluster data 206b to failover an unavailable managed node 112a based on the replication factors maintained by replication manager 202. In some embodiments, deployment data 206a can include information used to configure an instance of service 208 executing on a managed node 112 to run within cluster 106. Deployment data 206a can include, e.g., names and/or locations of any external resources or applications used by service 208, deployment environment-specific values, port numbers, addresses, etc. In some embodiments, cluster data 206b can include identifiers associated with the nodes within the cluster. For example, in a cluster that uses consistent hashing, the ring and associated hash values can be maintained in cluster data 206b. In some embodiments, cluster data 206b can include a node map that tracks which node identifiers (e.g., hash values) correspond to each D, P, and S replication factor. An example of service replication and failover, initiated by cluster monitor 204 upon detection of a node failure is described below with respect to FIGS. 3A and 3B.

Figure 3A:
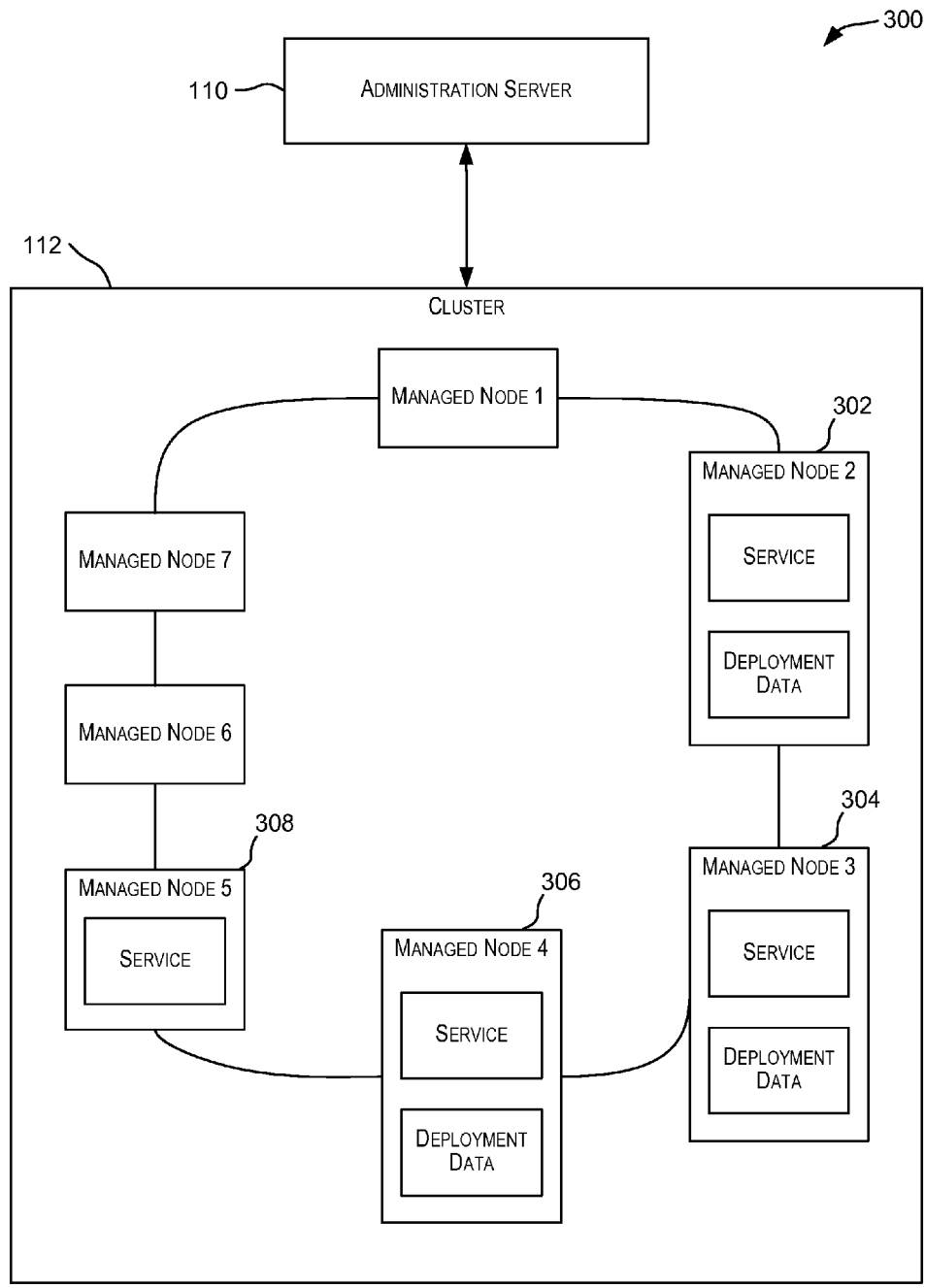
FIGS. 3A and 3B depict an example of service replication and failover according to an embodiment of the present invention.
Figure 3B:
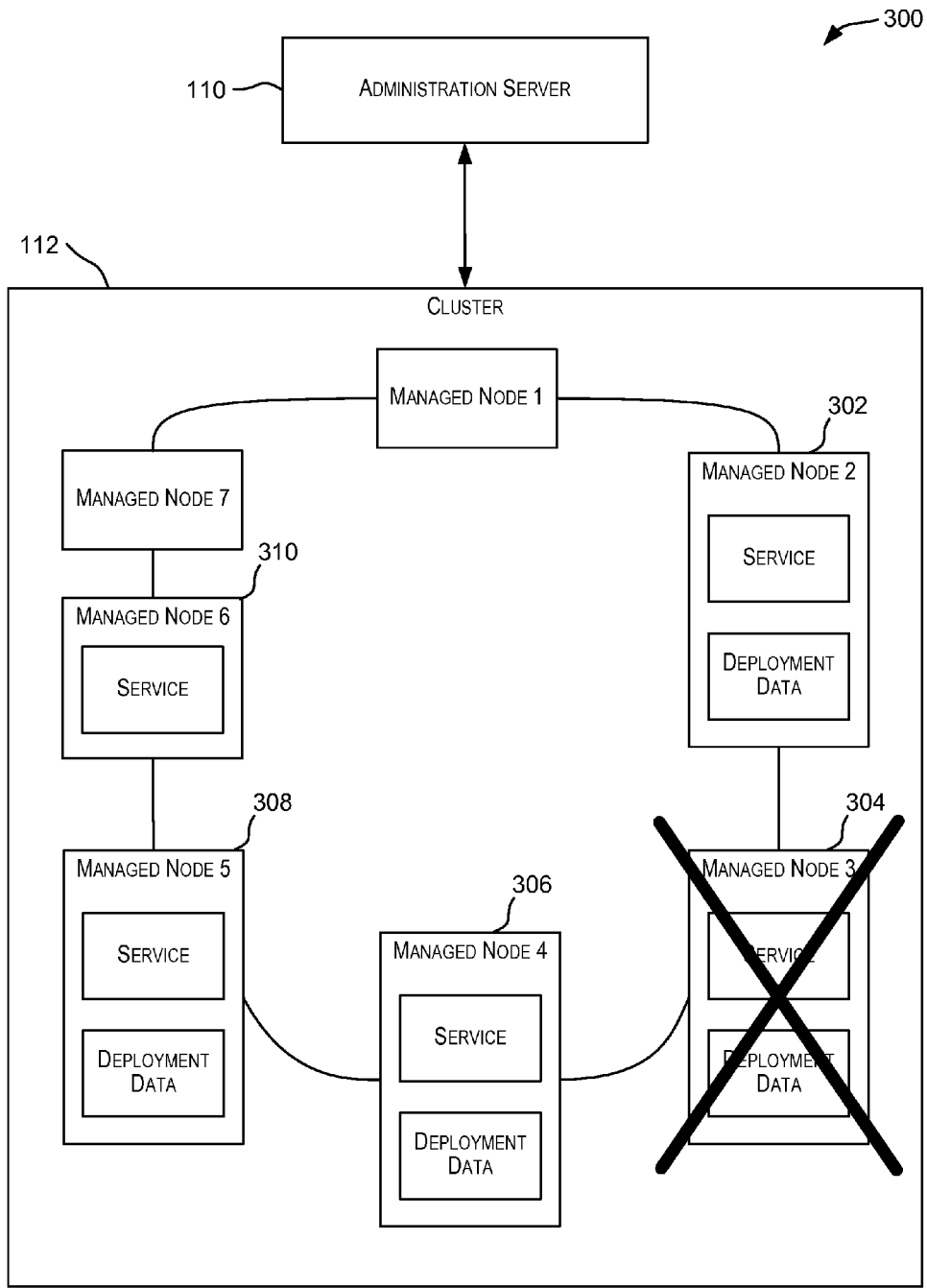

FIGS. 3A and 3B depict an example 300 of service replication and failover according to an embodiment of the present invention. As shown in FIG. 3A, a service can be deployed to managed nodes 112 based on a replication policy in which the deployment replication factor (D)=2, the prepared replication factor (P)=3, and the service replication factor (S)=4. The example shown in FIGS. 3A and 3B is simplified for illustration purposes and is not intended to be limiting. The teaching described herein may be similarly applied to larger and more complex cluster environments (e.g., environments in which multiple services are deployed across a large number of nodes).

Based on the replication policy, the service is deployed to two nodes (D=2): managed node 2 302 and managed node 3 304. In the event that either managed node 2 302 or managed node 3 304 fails, the service will become unavailable resulting in down time. To reduce potential down time, the service can be prepared on one or more managed nodes. Based on the replication policy, since P=3 and D=2, the service can be prepared on one node (P−D=1): managed node 4 306. Since S=4, the service can be replicated on one node (S−P=1): managed node 5 308.

As shown in FIG. 3B, administration server 110 can determine that managed node 3 304 has failed (e.g., the cluster monitor on administration server 110 can determine that managed node 3 has failed to heartbeat over a particular time period). Upon determining that managed node 3 304 has failed, administration server 110 can initiate failover. Administration server can send a notification to the next P node (managed node 4 306) to start the prepared service. As such, the service is deployed to two managed nodes, satisfying the number of nodes specified by replication factor D. As a result of starting the service on managed node 4 306, there is no longer a server on which the service is prepared. As such, administration server 110 can then prepare the service on the next managed node 5 308 on which the service had previously been replicated. Administration server 110 can prepare the service on managed node 5 308 by storing and/or updating deployment data for the service, thus satisfying the number of nodes specified by replication factor P. Administration server can then replicate the service to the next available node, managed node 6 310, satisfying the number of servers specified by replication factor S. In accordance with an embodiment, administration server 110 can update the node map maintained in cluster data 206b to reflect the updated managed nodes following the failure of managed node 3 304. In some embodiments, administration server can identify the next managed node using node identifiers assigned to each node in the cluster (e.g., hash values assigned to each node through a consistent hashing algorithm).

Figure 4:
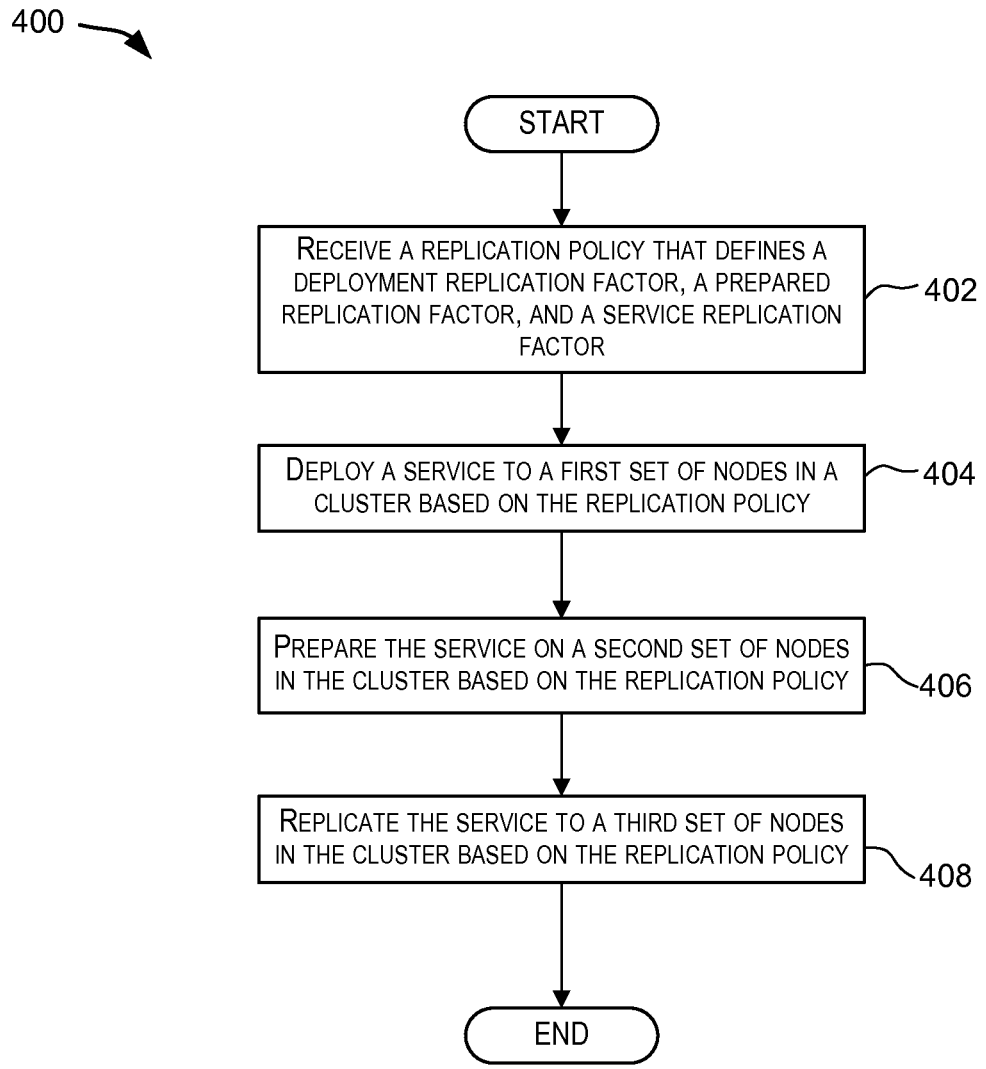
FIG. 4 depicts a simplified flowchart depicting processing performed for deploying services in a cluster according to an embodiment of the present invention.

FIG. 4 depicts a simplified flowchart 400 depicting processing performed for deploying services in a cluster according to an embodiment of the present invention. The processing depicted in FIG. 4 may be implemented in software (e.g., code, instructions, program) executed by one or more processing units (e.g., processors cores), hardware, or combinations thereof. The software may be stored in memory (e.g., on a memory device, on a non-transitory computer-readable storage medium). The particular series of processing steps depicted in FIG. 4 is not intended to be limiting. In one embodiment, the processing depicted in FIG. 4 is performed by server system 102 depicted in FIGS. 1 and 2.

The processing in flowchart 400 is initiated, at 402, when a replication policy is received that includes a deployment replication factor, a prepared replication factor, and a service replication factor. As described above, the deployment replication factor can specify a number of nodes on which a service is active. The prepared replication factor can specify a number of nodes on which the service is prepared (e.g., installed and configured, but not running). The service replication factor can specify the number of nodes the service is replicated (e.g., installed, but not configured).

At 404, the service is deployed to a first set of nodes in a cluster based on the replication policy. In some embodiments, each node in the cluster can be associated with a node identifier. For example, the cluster can implement a consistent hashing algorithm in which the cluster is associated with a ring that includes a number of hash values. Each node in the cluster can be associated with one hash value from the ring. In some embodiments, a node map can be maintained that associates each node's identifier with the corresponding replication factor.

At 406, the service can be prepared on a second set of nodes in the cluster based on the replication policy. Each node in the second set of nodes can include the service and deployment data such that the service can be started in the event of a node failure in the first set of nodes.

At 408, the service can be replicated to a third set of nodes in the cluster based on the replication policy. Each node in the third set of nodes can include the service without deployment data. In the event of node failure in the first set of nodes or the second set of nodes, deployment data can be provisioned to at least one node from the third set of nodes to prepare the service.

In some embodiments, the values of the replication factors (D, P, and S) can be configured by a user or administrator to adjust the level of service to suit the user's needs. In some embodiments, the user or administrator can configure parameters that represent the difference between D, P, and S (referred to herein as $D_X$, $P_X$, and $S_X$). As described above, $D_X$ can represent the first set of nodes in which the service is deployed and running (e.g., $D_X$=D); $P_X$ can represent the second set of nodes in which the service is prepared, other than the D nodes (e.g., P=$P_X$+D); and $S_X$ can represent the third set of nodes in which the service is replicated other than the P nodes (e.g., S=$S_X$+P).

Figure 5:
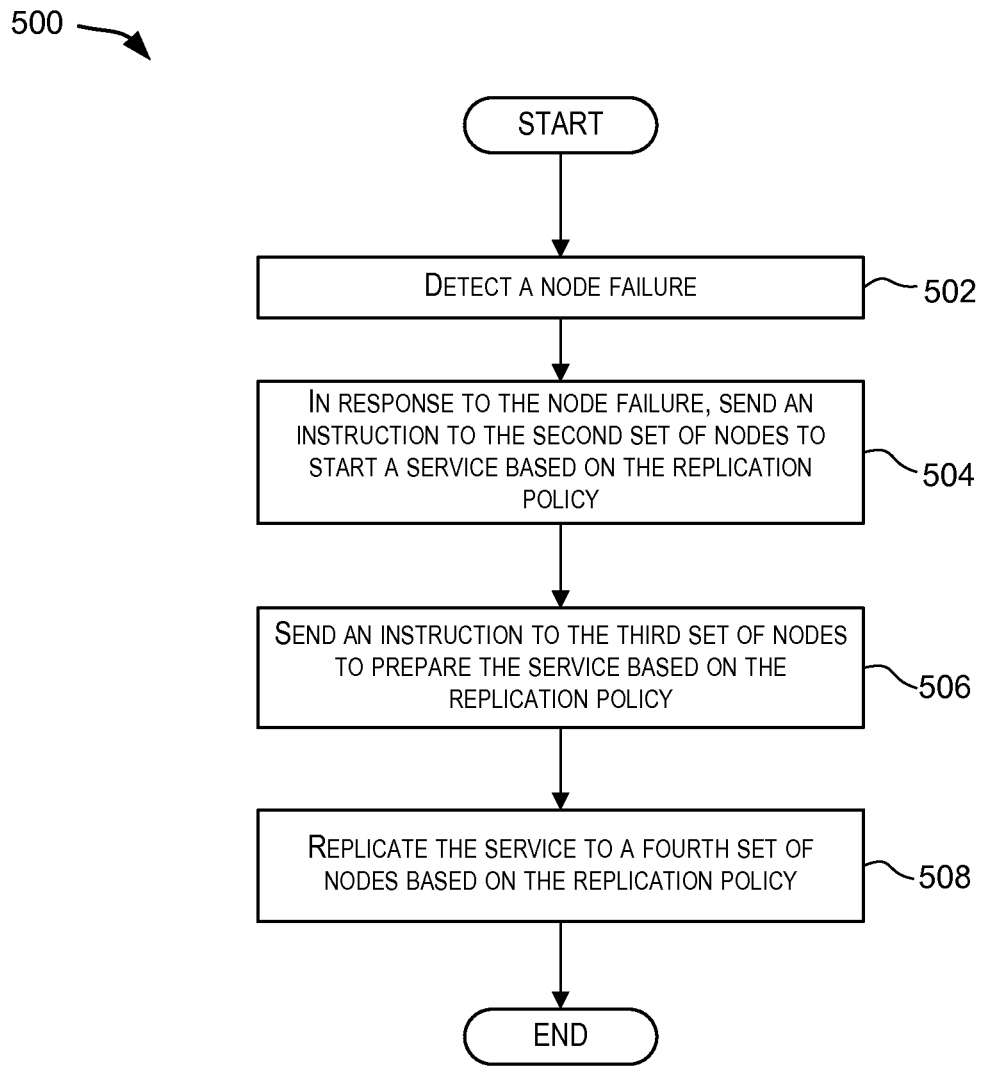
FIG. 5 depicts a simplified flowchart depicting processing performed for service failover in a cluster according to an embodiment of the present invention.

FIG. 5 depicts a simplified flowchart 500 depicting processing performed for service failover in a cluster according to an embodiment of the present invention. The processing depicted in FIG. 5 may be implemented in software (e.g., code, instructions, program) executed by one or more processing units (e.g., processors cores), hardware, or combinations thereof. The software may be stored in memory (e.g., on a memory device, on a non-transitory computer-readable storage medium). The particular series of processing steps depicted in FIG. 5 is not intended to be limiting. In one embodiment, the processing depicted in FIG. 5 is performed by server system 102 depicted in FIGS. 1 and 2.

The processing in flowchart 500 is initiated, at 502, when a node failure is detected by the computer system. In some embodiments, the node failure is detected from the first set of nodes. In some embodiments, the node failure can be detected based on a failure of the node to send one or more heartbeat messages in a particular time period.

At 504, in response to the node failure, an instruction can be sent to at least one node from the second set of nodes to start the service. The second set of nodes can include one or more nodes on which the service has been prepared (e.g., the service is installed and configured, but not started). In some embodiments, the instruction can include deployment data to configure the service for the cluster (e.g., including cluster-specific configuration information).

At 506, an instruction can be sent to at least one node from the third set of nodes to prepare the service. The third set of nodes can include one or more nodes to which the service has been replicated (e.g., installed but not configured).

At 508, the service can be replicated to at least one node from a fourth set of nodes. The fourth set of nodes can include any remaining nodes in the cluster that have not had the service deployed, prepared, replicated.

Figure 6:
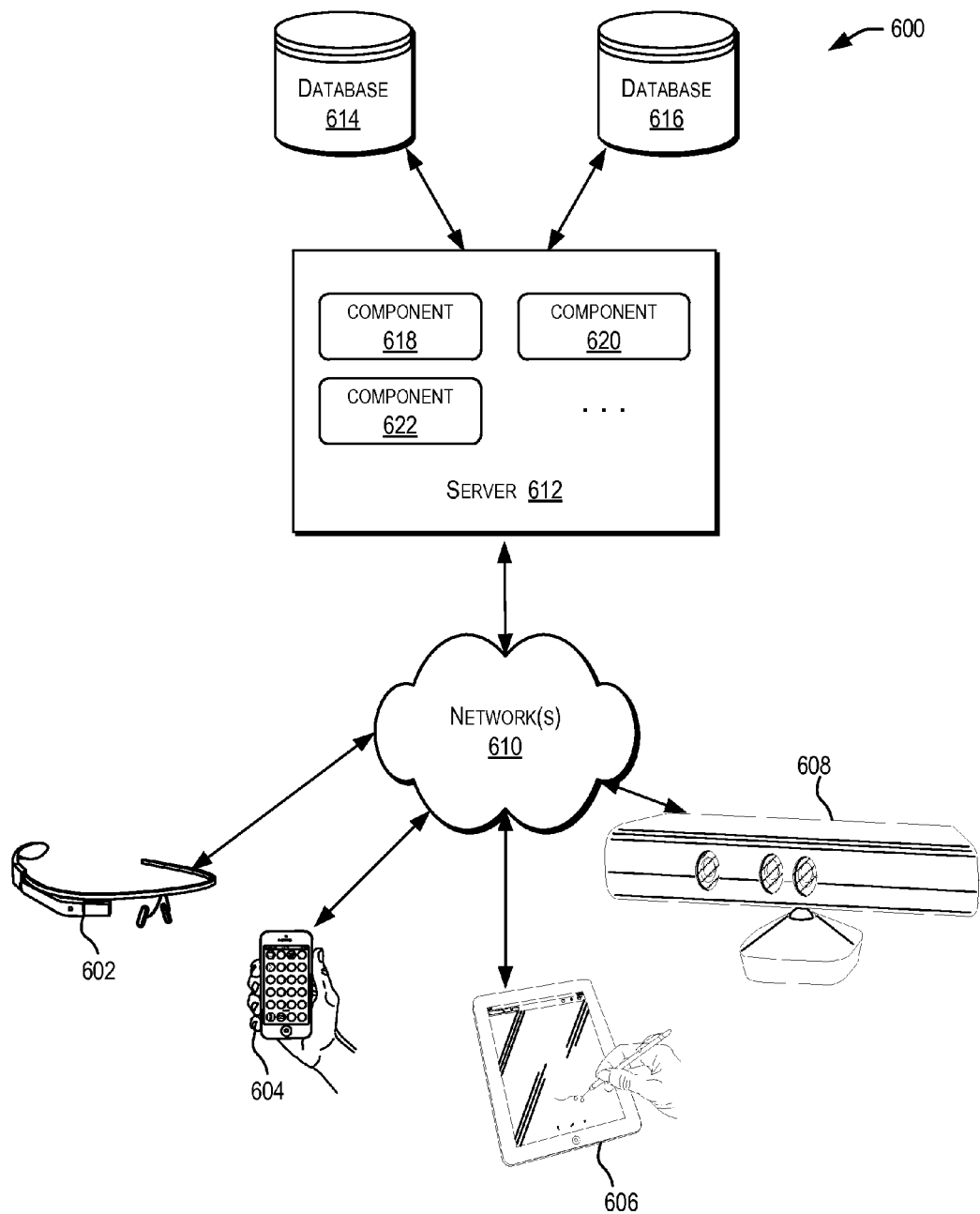
FIG. 6 depicts a simplified diagram of a distributed system for implementing an embodiment.

FIG. 6 depicts a simplified diagram of a distributed system 600 for implementing an embodiment. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications such as services and applications that provide the document (e.g., webpage) analysis and modification-related processing. In certain embodiments, server 612 may also provide other services or software applications can include non-virtual and virtual environments. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in FIG. 6 is thus one example of a distributed system for implementing an embodiment system and is not intended to be limiting.

Client computing devices 602, 604, 606, and/or 608 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 610.

Although distributed system 600 in FIG. 6 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization. One or more flexible pools of logical storage devices can be virtualized to maintain virtual storage devices for the server. Virtual networks can be controlled by server 612 using software defined networking In various embodiments, server 612 may be adapted to run one or more services or software applications described in the foregoing disclosure. For example, server 612 may correspond to a server for performing processing as described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. These databases may provide a mechanism for storing information such as user interactions information, usage patterns information, adaptation rules information, and other information used by embodiments of the present invention. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

Figure 7:
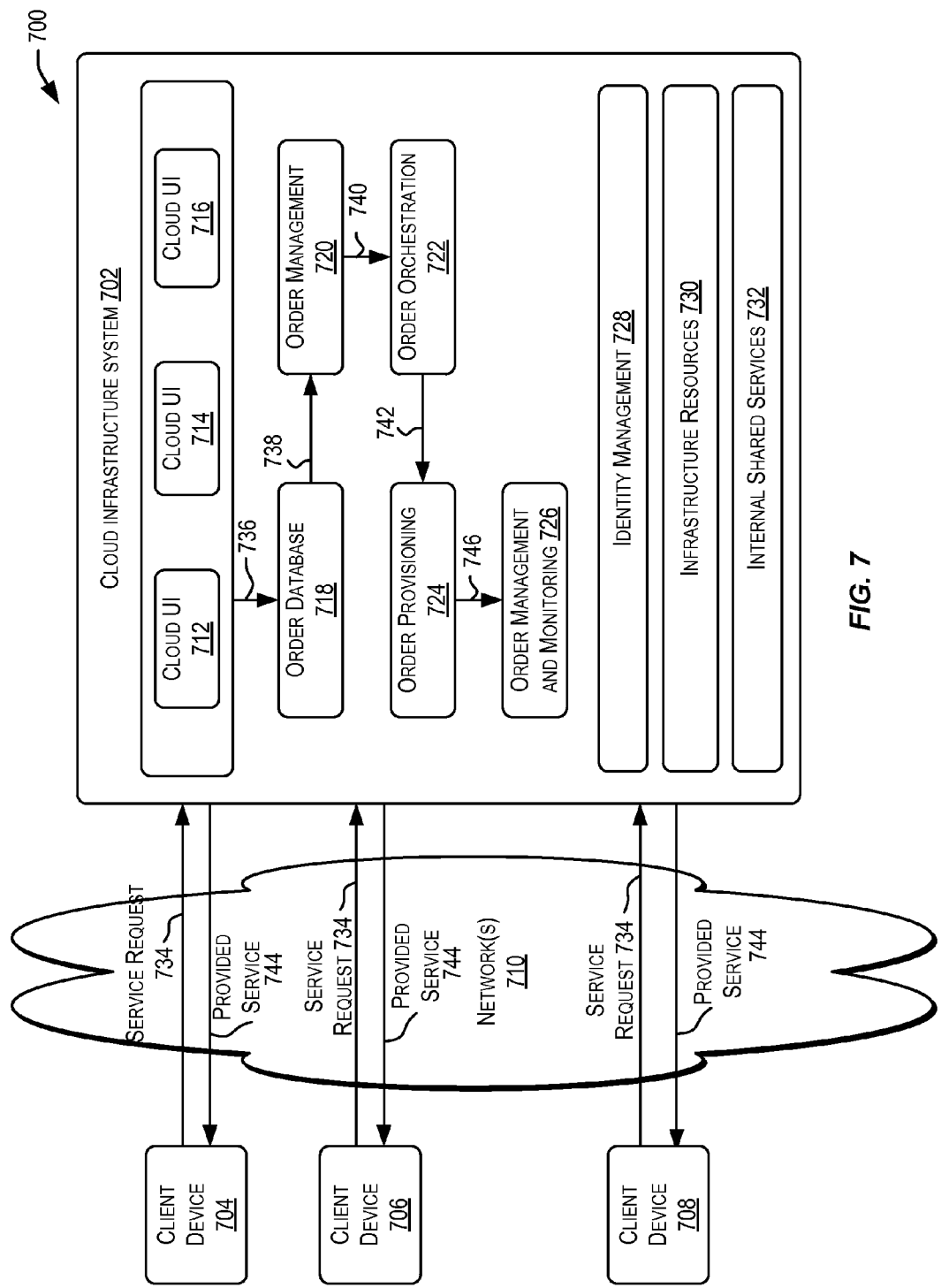
FIG. 7 is a simplified block diagram of one or more components of a system environment in which services may be offered as cloud services, in accordance with an embodiment of the present disclosure.

In some embodiments, the document analysis and modification services described above may be offered as services via a cloud environment. FIG. 7 is a simplified block diagram of one or more components of a system environment 700 in which services may be offered as cloud services, in accordance with an embodiment of the present disclosure. In the illustrated embodiment in FIG. 7, system environment 700 includes one or more client computing devices 704, 706, and 708 that may be used by users to interact with a cloud infrastructure system 702 that provides cloud services, including services for dynamically modifying documents (e.g., webpages) responsive to usage patterns. Cloud infrastructure system 702 may comprise one or more computers and/or servers that may include those described above for server 612.

It should be appreciated that cloud infrastructure system 702 depicted in FIG. 7 may have other components than those depicted. Further, the embodiment shown in FIG. 7 is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608. Client computing devices 704, 706, and 708 may be configured to operate a client application such as a web browser, a proprietary client application (e.g., Oracle Forms), or some other application, which may be used by a user of the client computing device to interact with cloud infrastructure system 702 to use services provided by cloud infrastructure system 702. Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

In certain embodiments, services provided by cloud infrastructure system 702 may include a host of services that are made available to users of the cloud infrastructure system on demand. In addition to services related to dynamic document modification responsive usage patterns, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 702 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 702 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle Corporation) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 702 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 702 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform, and other resources.

In some embodiments, resources in cloud infrastructure system 702 may be shared by multiple users and dynamically re-allocated per demand. Additionally, resources may be allocated to users in different time zones. For example, cloud infrastructure system 702 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 to enable provision of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in FIG. 7, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In an exemplary operation, at 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI) such as cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

At 736, the order information received from the customer may be stored in an order database 718. If this is a new order, a new record may be created for the order. In one embodiment, order database 718 can be one of several databases operated by cloud infrastructure system 718 and operated in conjunction with other system elements.

At 738, the order information may be forwarded to an order management module 720 that may be configured to perform billing and accounting functions related to the order, such as verifying the order, and upon verification, booking the order.

At 740, information regarding the order may be communicated to an order orchestration module 722 that is configured to orchestrate the provisioning of services and resources for the order placed by the customer. In some instances, order orchestration module 722 may use the services of order provisioning module 724 for the provisioning. In certain embodiments, order orchestration module 722 enables the management of business processes associated with each order and applies business logic to determine whether an order should proceed to provisioning.

As shown in the embodiment depicted in FIG. 7, at 742, upon receiving an order for a new subscription, order orchestration module 722 sends a request to order provisioning module 724 to allocate resources and configure resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. This enables order orchestration module 722 to be isolated from implementation details, such as whether or not services and resources are actually provisioned on the fly or pre-provisioned and only allocated/assigned upon request.

At 744, once the services and resources are provisioned, a notification may be sent to the subscribing customers indicating that the requested service is now ready for use. In some instance, information (e.g. a link) may be sent to the customer that enables the customer to start using the requested services.

At 746, a customer's subscription order may be managed and tracked by an order management and monitoring module 726. In some instances, order management and monitoring module 726 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 700 may include an identity management module 728 that is configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
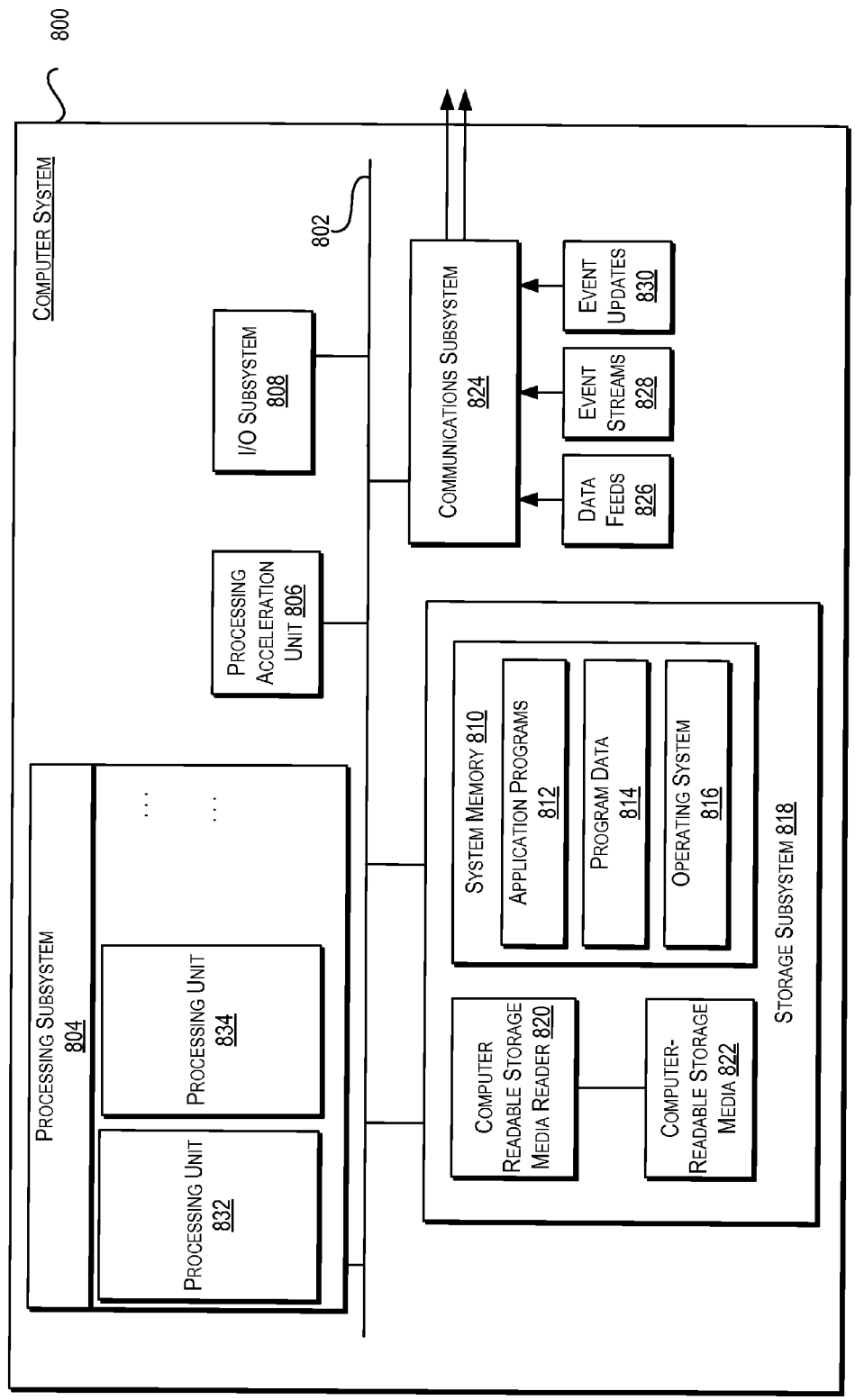
FIG. 8 illustrates an exemplary computer system that may be used to implement an embodiment of the present invention.

FIG. 8 illustrates an exemplary computer system 800 that may be used to implement an embodiment of the present invention. In some embodiments, computer system 800 may be used to implement any of the various servers and computer systems described above. As shown in FIG. 8, computer system 800 includes various subsystems including a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 may include tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processing units 832, 834, etc. A processing unit may include be one or more processors, including single core or multicore processors, one or more cores of processors, or combinations thereof. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 810 including potentially on one or more storage devices. Through suitable programming, processing subsystem 804 can provide various functionalities described above for dynamically modifying documents (e.g., webpages) responsive to usage patterns.

In certain embodiments, a processing acceleration unit 806 may be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term "input device" is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information that is used by computer system 800. Storage subsystem 818 provides a tangible non-transitory computer-readable storage medium for storing the basic programming and data constructs that provide the functionality of some embodiments. Software (programs, code modules, instructions) that when executed by processing subsystem 804 provide the functionality described above may be stored in storage subsystem 818. The software may be executed by one or more processing units of processing subsystem 804. Storage subsystem 818 may also provide a repository for storing data used in accordance with the present invention.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM) or dynamic random access memory (DRAM).

By way of example, and not limitation, as depicted in FIG. 8, system memory 810 may store application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 822 may store programming and data constructs that provide the functionality of some embodiments. Software (programs, code modules, instructions) that when executed by processing subsystem 804 a processor provide the functionality described above may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 822 may provide storage of computer-readable instructions, data structures, program modules, and other data for computer system 800.

In certain embodiments, storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for storing computer-readable information.

In certain embodiments, computer system 800 may provide support for executing one or more virtual machines. Computer system 800 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 800. Accordingly, multiple operating systems may potentially be run concurrently by computer system 800. Each virtual machine generally runs independently of the other virtual machines.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, communications subsystem 824 may receive input communication in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
receiving, by a computer system, a replication policy including a plurality of replication factors;
deploying a service to a first set of nodes in a server cluster based on a first replication factor;
preparing the service on a second set of nodes in the server cluster based on a second replication factor, wherein preparing the service on the second set of nodes comprises installing the service on each node in the second set of nodes and storing deployment data to configure the service on each node in the second set of nodes; and
replicating the service to a third set of nodes in the server cluster based on a third replication factor.

2. The method of claim 1 wherein the plurality of replication factors are configurable by a user.

3. The method according to claim 1, wherein the first replication factor, the second replication factor and the third replication factor are different replication factors from each other.

4. The method of claim 1 wherein replicating the service to a third set of nodes comprises installing the service on each node in the third set of nodes.

5. The method of claim 1, further comprising:
detecting, by the computer system, a node failure from the first set of nodes; and
in response to the node failure
sending an instruction to at least one node from the second set of nodes to start the service,
sending an instruction to at least one node from the third set of nodes to prepare the service, and
replicating the service to at least one node from a fourth set of nodes.

6. The method of claim 5 wherein the instruction to the third set of nodes includes deployment data to configure the service for the server cluster.

7. The method of claim 5 wherein the fourth set of nodes includes any nodes in the server cluster not included in the first set of nodes, second set of nodes, or third set of nodes.

8. A non-transitory computer readable storage medium including instructions stored thereon which, when executed by a processor, cause the processor to perform a method comprising:
receiving a replication policy including a plurality of replication factors;
deploying a service to a first set of nodes in a server cluster based on a first replication factor;
preparing the service on a second set of nodes in the server cluster based on a second replication factor, wherein preparing the service on the second set of nodes comprises installing the service on each node in the second set of nodes and storing deployment data to configure the service on each node in the second set of nodes; and
replicating the service to a third set of nodes in the server cluster based on a third replication factor.

9. The non-transitory computer readable storage medium of claim 8 wherein the plurality of replication factors are configurable by a user.

10. The non-transitory computer readable storage medium of claim 8 wherein replicating the service to a third set of nodes comprises installing the service on each node in the third set of nodes.

11. The non-transitory computer readable storage medium of claim 8, further comprising:
detecting, by the computer system, a node failure from the first set of nodes; and
in response to the node failure
sending an instruction to at least one node from the second set of nodes to start the service,
sending an instruction to at least one node from the third set of nodes to prepare the service, and
replicating the service to at least one node from a fourth set of nodes.

12. The non-transitory computer readable storage medium of claim 11 wherein the instruction to the third set of nodes includes deployment data to configure the service for the server cluster.

13. The non-transitory computer readable storage medium of claim 11 wherein the fourth set of nodes includes any nodes in the server cluster not included in the first set of nodes, second set of nodes, or third set of nodes.

14. A system comprising:
a server cluster, including an administration server and a plurality of managed nodes;
a replication manager, on the administration server, wherein the replication manager is configured to receive a replication policy including a plurality of replication factors; and
a cluster monitor, on the administration server, wherein the cluster monitor is configured to
deploy a service to a first set of nodes in a server cluster based on a first replication factor;
prepare the service on a second set of nodes in the server cluster based on a second replication factor, wherein preparing the service on the second set of nodes comprises installing the service on each node in the second set of nodes and storing deployment data to configure the service on each node in the second set of nodes; and
replicate the service to a third set of nodes in the server cluster based on a third replication factor.

15. The system of claim 14 wherein the plurality of replication factors are configurable by a user.

16. The system of claim 14 wherein replicating the service to a third set of nodes comprises installing the service on each node in the third set of nodes.

17. The system of claim 14, wherein the cluster monitor is further configured to:
   detect a node failure from the first set of nodes; and
   in response to the node failure
      send an instruction to at least one node from the second set of nodes to start the service,
      send an instruction to at least one node from the third set of nodes to prepare the service, and
      replicate the service to at least one node from a fourth set of nodes.

18. The system of claim 17 wherein the instruction to the third set of nodes includes deployment data to configure the service for the server cluster, and wherein the fourth set of nodes includes any nodes in the server cluster not included in the first set of nodes, second set of nodes, or third set of nodes.

* * * * *

UNITED STATES PATENT AND TRADEMARK OFFICE
CERTIFICATE OF CORRECTION

PATENT NO. : 9,672,123 B2  Page 1 of 1
APPLICATION NO. : 14/588148
DATED : June 6, 2017
INVENTOR(S) : Duggana et al.

It is certified that error appears in the above-identified patent and that said Letters Patent is hereby corrected as shown below:

On the Title Page

Column 2, under Other Publications, Line 6, delete "%2%" and insert -- %2F% --, therefor.

In the Specification

In Column 2, Line 59, after "running" insert -- . --.

In Column 4, Line 48, delete "and or" and insert -- and/or --, therefor.

In Column 8, Lines 64-65, after "networking" insert -- . --.

Signed and Sealed this
Thirtieth Day of January, 2018

Joseph Matal
*Performing the Functions and Duties of the
Under Secretary of Commerce for Intellectual Property and
Director of the United States Patent and Trademark Office*